United States Patent [19]

O'Brien et al.

[11] Patent Number: 5,562,207

[45] Date of Patent: * Oct. 8, 1996

[54] SHORT END CAP STORAGE PACKAGE

[75] Inventors: Patrick J. O'Brien, Maywood, N.J.; Larry Durham, Huntington Beach, Calif.

[73] Assignee: Ivy Hill Corporation, New York, N.Y.

[ * ] Notice: The portion of the term of this patent subsequent to Mar. 3, 2013, has been disclaimed.

[21] Appl. No.: 249,019

[22] Filed: May 25, 1994

Related U.S. Application Data

[63] Continuation-in-part of Ser. No. 126,240, Sep. 24, 1993, Pat. No. 5,531,321, Ser. No. 983,634, Dec. 1, 1992, Pat. No. 5,372,253, and Ser. No. 25,982, Mar. 3, 1993, Pat. No. 5,366,074, which is a continuation-in-part of Ser. No. 817,897, Jan. 8, 1992, Pat. No. 5,188,230, which is a continuation-in-part of Ser. No. 807,477, Dec. 12, 1991, Pat. No. 5,219,417, which is a continuation-in-part of Ser. No. 698,201, May 10, 1991, Pat. No. 5,205,405, said Ser. No. 126,240, is a division of Ser. No. 70,713, May 28, 1993, Pat. No. 5,425,448, said Ser. No. 983,634, is a continuation of Ser. No. 817,897.

[51] Int. Cl.$^6$ .......................... B65D 85/30; B65D 85/672; B65D 85/57

[52] U.S. Cl. .................. 206/307; 206/387.13; 206/310; 206/312

[58] Field of Search .............................. 229/103.2, 23 R, 229/125.125; 220/528, 555, 410; 206/387.13, 387.1, 493, 308.1, 472, 307, 310, 312

[56] References Cited

U.S. PATENT DOCUMENTS

| | | | |
|---|---|---|---|
| 2,581,944 | 1/1952 | Donnell | 229/125.125 |
| 4,011,940 | 3/1977 | Neal et al. | 206/472 X |
| 4,802,601 | 2/1989 | Pijanowski et al. | 206/387.1 X |
| 4,921,097 | 5/1991 | Finke | 206/387.1 |
| 5,101,971 | 4/1992 | Grobecker | 206/308.1 X |
| 5,188,230 | 2/1993 | O'Brien et al. | 206/312 |
| 5,205,405 | 4/1993 | O'Brien et al. | 206/310 |
| 5,219,417 | 6/1993 | O'Brien et al. | 206/312 |
| 5,353,947 | 10/1994 | Zinnbauer et al. | 220/528 X |
| 5,366,074 | 11/1994 | O'Brien et al. | 206/308.1 X |

FOREIGN PATENT DOCUMENTS

2266514  11/1993  United Kingdom .

*Primary Examiner*—B. Dayoan
*Attorney, Agent, or Firm*—Amster, Rothstein & Ebenstein

[57] ABSTRACT

An optionally glueless storage package for an article includes a plurality of panels, the plurality of panels being movable between an open orientation enabling access to the contents of the package and a collapsed orientation for storage purposes. A holder formed of plastic is disposed on one of the end panels for receiving and maintaining an article thereon. The holder has a far end thereof, remote from the other of the end panels when the plurality of panels is in the open orientation, and an upwardly projecting end wall thereon defining a central recess. An end cap formed of plastic has a near end directly pivotally secured to the holder far end, the end cap far end being a free end. The end cap has a portion thereof adapted to releasably engage the holder end wall when the plurality of panels is in the collapsed orientation and the end cap occupies the holder end wall recess such that the far end cap end maintains the plurality of panels in the collapsed orientation, thereby to preclude accidental movement of the plurality of panels out of the collapsed orientation. The end cap is permanently secured to the holder only at the end cap near end and is devoid of any living hinge or line of weakness intermediate the ends thereof.

28 Claims, 5 Drawing Sheets

SHORT END CAP STORAGE PACKAGE

CROSS-REFERENCES TO RELATED APPLICATIONS

The present application is a continuation-in-part of Ser. No. 08/126,240, filed Sep. 24, 1993, now U.S. Pat. No. 5,531,321, itself a division of Ser. No. 08/070,713, now U.S. Pat. No. 5,425,448, filed May 28, 1993; and it is also a continuation-in-part both of Ser. No. 07/983,634, now U.S. Pat. No. 5,372,253, filed Dec. 1, 1992, itself a continuation of Ser. No. 07/817,897, filed Jan. 8, 1992, now U.S. Pat. No. 5,188,230, and of Ser. No. 08/025,982, filed Mar. 3, 1993, now U.S. Pat. No. 5,366,074, itself a continuation-in-part of Ser. No. 07/817,897, filed Jan. 8, 1992, now U.S. Pat. No. 5,188,230. Ser. No. 07/817,897, filed Jan. 8, 1992, now U.S. Pat. No. 5,188,230, is itself a continuation-in-part of Ser. No. 07/807,477, filed Dec. 12, 1991, now U.S. Pat. No. 5,219,417, itself a continuation-in-part of Ser. No. 07/698,201, filed May 10, 1991, now U.S. Pat. No. 5,205,405.

BACKGROUND OF THE INVENTION

The present invention relates to storage packages, such as storage packages for recording media, and in particular to such a storage package which utilizes a short flipper to maintain the plurality of panels in a collapsed orientation for storage purposes and is optionally glueless for ecological purposes.

U.S. Pat. No. 5,188,230 discloses a storage package, such as a storage package for a recording medium, comprising a plurality of paperboard panels, a holder formed of plastic, and an end cap formed of plastic. The plurality of panels is movable between an open orientation enabling access to the contents of the package and a collapsed orientation for storage purposes. The holder is disposed on one of the end panels for receiving and maintaining an article (such as a recording medium) thereon, the holder having one end thereof remote from the other of the end panels when the plurality of panels are in the open orientation. An end cap or flipper has one end directly pivotally secured (e.g., by a living hinge) to the one end of the holder. The end cap has a portion thereof spaced from the one end thereof adapted to releasably engage the holder (e.g., the holder lateral sidewalls) at a portion thereof spaced from the one end of the holder when the plurality of panels is in the collapsed orientation and to maintain the plurality of panels in the collapsed orientation, thereby to preclude accidental movement of the plurality of panels out of the collapsed orientation. As illustrated therein, the end cap extends substantially the length of a full end of the holder (or at least substantially the full length thereof) and therefore extends the full length of a panel end.

The aforementioned design utilizing a "large" flipper or end cap—i.e., a flipper coextensive in length with an end of the holder and/or panel—has not always proven to be entirely satisfactory in use. The portion of the flipper which overlies an entire end of the top panel (i.e., the front panel) from one lateral sidewall to the other reduces the already limited space available on the top panel for artwork and the like. Additionally, from an aesthetic point of view the flipper is a distraction because it detracts from the package resembling a book. Finally, although the resistance afforded by the living hinge connecting the end cap to the holder and extending the full length of the holder and/or panel is only minimal, it may appear more formidable to a potential user.

U.K. Patent Application GB 2,266,514A published Nov. 3, 1993, discloses a container for a compact disc which utilizes a flipper of substantially reduced length compared to the holder end wall. However, this flipper is formed separately from the holder and must therefore be attached to the holder subsequently in a separate operation. Additionally, the flipper itself defines a line of weakness or living hinge which, it is believed, adversely effects the longevity of the flipper.

A further disadvantage of the storage packages illustrated in the aforementioned U.S. Pat. No. 5,188,230 is their use of glue in order to secure together the holder and one of the panels. In certain European countries requiring the separate recycling of paperboard and plastic materials, it is highly desirable, if not mandatory, that every article be easily separable into its paperboard and plastic components. Accordingly, such storage packages have been modified in various ways to produce glueless embodiments—see, for example, the aforementioned U.S. patent applications Ser. Nos. 08/025,982 and 08/126,240. In certain of these glueless embodiments, the holder must be provided with additional living hinges, thus leading to manufacturing difficulties. In other of these glueless embodiments, the bottom or back panel tends to bow outwardly from the bottom or back face of the holder at the lateral sides thereof.

Accordingly, it is an object of the present invention to provide a storage package, such as a storage package for a recording medium, which in a preferred embodiment utilizes a short flipper having a length substantially less than that of the holder end or panel end wall.

Another object is to provide such a storage package wherein the end cap is permanently secured to the holder only at one end of the end cap and is devoid of any living hinge or line of weakness intermediate the ends thereof.

A further object is to provide a storage package, such as a storage package for a recording medium, which in a preferred embodiment is glueless to facilitate separation of the paperboard and plastic components thereof and yet holds the lateral sidewalls of the bottom or back panel to the holder without bowing.

It is another object of the present invention to provide a plastic intermediate for use in making such storage packages.

It is a further object to provide such storage packages and intermediates which are simple and inexpensive to manufacture, maintain and use.

SUMMARY OF THE INVENTION

It has now been found that the above and related objects of the present invention are obtained in a storage package for an article comprising a plurality of panels including a pair of end panels, the plurality of panels being movable between an open orientation enabling access to the contents of the package and a collapsed orientation for storage purposes. A holder formed of plastic is disposed on one of the end panels for receiving an article therein, the holder having one end thereof remote from the other of the end panels when the plurality of panels is in the open orientation. The holder has a pair of opposed lateral sidewalls and on the one end an upwardly projecting end wall defining a central recess. An end cap or flipper formed of plastic has a pair of ends, one end of the end cap being directly pivotally secured to the holder end and the other end of the end cap being a free end. The end cap has a portion thereof adapted to releasably engage the holder end wall when the plurality of panels is in the collapsed orientation and the end cap occupies the holder end wall recess such that the other end of the end cap maintains the plurality of panels in the collapsed orientation, thereby to preclude accidental movement of the plurality of panels out of the collapsed orientation. The end cap is permanently secured to the holder only at the one end of the end cap and is devoid of any living hinge or line of weakness intermediate the ends thereof.

In a preferred embodiment, the end cap is directly pivotally secured to the holder by a living hinge, the living hinge extending substantially less than the entire width of the holder end wall. Preferably the end cap and the holder are of a unitary, integral, one-piece construction formed in a single molding operation. The end cap plastic is preferably polypropylene, but may be different than the holder plastic. The end cap is generally L-shaped and has a pair of opposed lateral sidewalls defining end cap engaging means and a connecting portion connecting the same. The holder has a generally planar end wall and a pair of facing holder end wall edges defining holder engaging means adapted to engage cooperatively with the end cap engaging means. The end cap portion is appreciably spaced from the end cap ends and adapted to releasably engage the holder end wall at a portion thereof spaced from the one end of the holder.

The plurality of panels is preferably formed of paperboard. The plurality of panels in the open orientation has no panel overlying the panel on which the holder is disposed, thereby enabling access to the holder and any article thereon, and in the collapsed orientation has each of the panels overlapping one another, thereby to provide a compact package for storage.

The present invention also encompasses a storage package intermediate for use with a plurality of panels including a pair of end panels, the plurality of panels being movable between an open orientation enabling access to the contents of the package and a collapsed orientation for storage purposes. The intermediate comprises a holder formed of plastic configured and dimensioned to be disposed on one of the end panels for receiving an article therein. The holder has one end thereof remote from the other of the end panels when the plurality of panels is in the open orientation. The holder has a pair of opposed lateral sidewalls and on the one end an upwardly projecting end wall defining a central recess. An end cap formed of plastic has a pair of ends, one end of the end cap being configured and dimensioned to be directly pivotally secured to the one end of the holder and the other end of the end cap being a free end. The end cap has a portion thereof spaced from both the ends thereof adapted to releasably engage the holder end wall at a portion thereof spaced from the one end of the holder when the plurality of panels is in the collapsed orientation and the end cap occupies the holder end wall recess such that the other end of the end cap maintains the plurality of panels in the collapsed orientation, thereby to preclude accidental movement of the plurality of panels out of the collapsed orientation. The end cap is permanently secured to the holder only at the one end of the end cap and is devoid of any living hinge or line of weakness intermediate the ends thereof.

The present invention additionally encompasses a glueless storage package for an article comprising a substantially rigid compartment or holder. The compartment is formed of plastic and has an open top, a bottom, a front end, a back end, and a pair of lateral sides connecting the ends, for receiving an article through the open top. The compartment at least partially defines an (a) open-top transverse slot at the back end, (b) an open-bottom interior chamber having a passageway thereinto leading from the bottom into the chamber and a horizontally-extending ledge in the chamber, and (c) adjacent the compartment bottom and adjacent each the lateral side thereof a horizontally-extending retainer and an undercut between the retainer and the compartment bottom. A plurality of interconnected panels includes a top end panel, a bottom end panel, an outer spine connecting the end panels, and an inner spine flap secured to the outer spine. The panels are movable between a collapsed orientation, wherein the panels are substantially overlying, and an open orientation, wherein the panels are not substantially overlying. The flap is configured and dimensioned to be at least partially received in the open-top transverse slot, the bottom end panel having adjacent each lateral side thereof a weakened and recessed portion adapted to be forcibly received and releasably maintained in a respective one of the undercuts, and the bottom end panel defining at a free end thereof a resiliently bent end portion. The end portion defines a panel slot and is configured and dimensioned to pass through the passageway into the chamber and to at least partially unbend within the chamber such that the chamber ledge enters the panel slot to releasably resist removal of the end portion from the chamber. The package is devoid of glue securing the compartment to the panels.

In a preferred embodiment, the chamber and passageway extend substantially the length of an edge of the compartment. The panels and spine are formed of resilient paperboard.

A glueless storage package intermediate comprises a substantially rigid compartment, formed of plastic and having an open top, a bottom, a front end, a back end and a pair of lateral sides connecting the ends, for receiving an article through the open top and maintaining the article therein. The compartment at least partially defines an open-top transverse slot at the back end, an open-bottom interior chamber having a passageway thereinto leading from the bottom into the chamber and a horizontally-extending ledge in the chamber, and adjacent the compartment bottom and adjacent each the lateral side thereof a horizontally-extending retainer and an undercut between the retainer and the compartment bottom.

Another glueless storage package intermediate for use therewith comprises a plurality of interconnected panels including a top end panel, a bottom end panel, and a spine connecting the end panels. The panels are movable between a collapsed orientation, wherein the panels are substantially overlying, and an open orientation, wherein the panels are not substantially overlying. The bottom end panel has adjacent each lateral side thereof a weakened and recessed portion adapted to be forcibly received and releasably maintained in a respective one of the undercuts. Preferably where the compartment at least partially defines an open-top transverse slot adjacent the back end, the plurality of panels additionally includes a flap secured at one end to the spine, the flap being configured and dimensioned to be at least partially received in the open-top transverse slot of the compartment. Preferably where the compartment defines an open-bottom interior chamber having a passageway thereinto leading from the bottom into the chamber and a horizontally-extending ledge, the bottom panel defines at a free end thereof a resiliently bent end portion, the end portion defining a panel slot and being configured and dimensioned to pass through the passageway into the chamber and to at least partially unbend within the chamber such that the chamber ledge enters the panel slot to releasably resist removal of the end portion from the chamber.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENT

Figure 1:
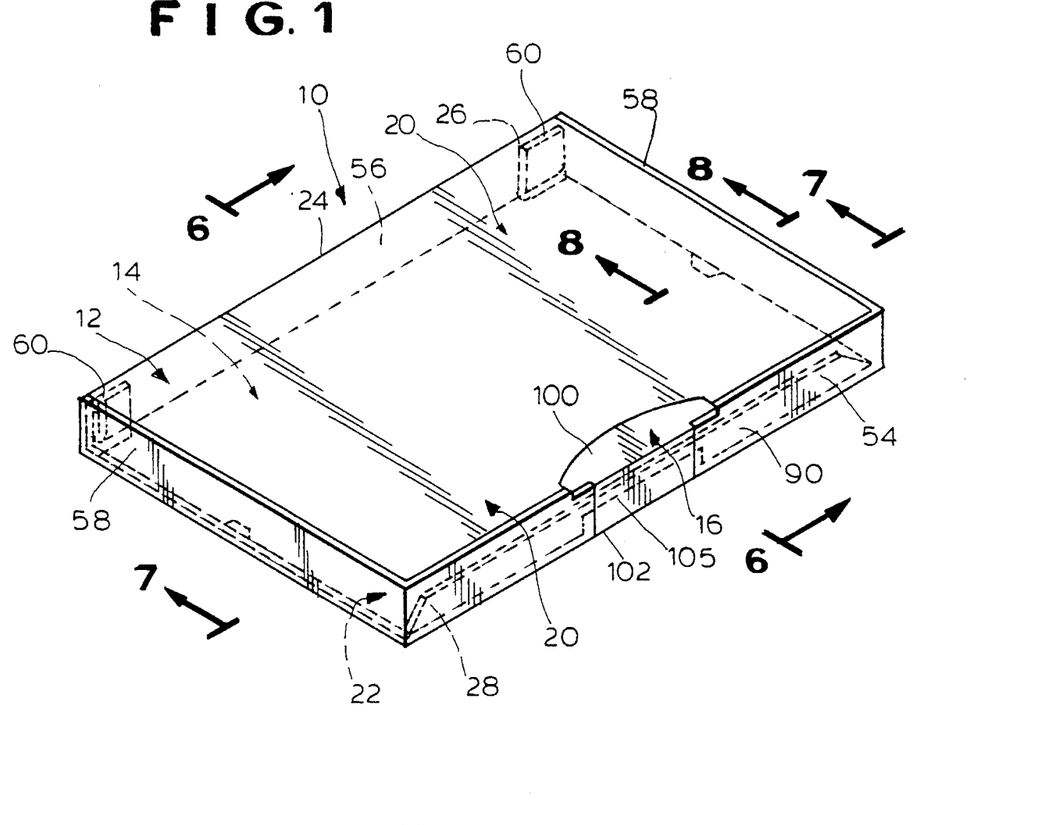
FIG. 1 is an isometric view of a storage package according to the present invention, the storage package being in the closed orientation.

Referring now to the drawing, and in particular to FIG. 1 thereof, therein illustrated is a storage package according to the present invention, generally designated by the reference numeral 10. The storage package 10 is illustrated in FIG. 1 in a collapsed orientation suitable for storage of various articles therein such as a recording medium, compact disc, or the like. While the illustrated embodiment is described hereinbelow as used with audio-storage media, and in particular a pair of audiocassettes, clearly the principles of the present invention are equally operable where the storage package is configured and dimensioned to hold a greater or lesser number of articles or articles of a different size and configuration. The storage package 10 is comprised essentially of a plurality of panels generally designated by the reference numeral 10, a compartment or holder generally designated by the reference numeral 14 and an end cap generally designated by the reference numeral 16. Each of these basic elements will now be discussed in turn.

Figure 4:
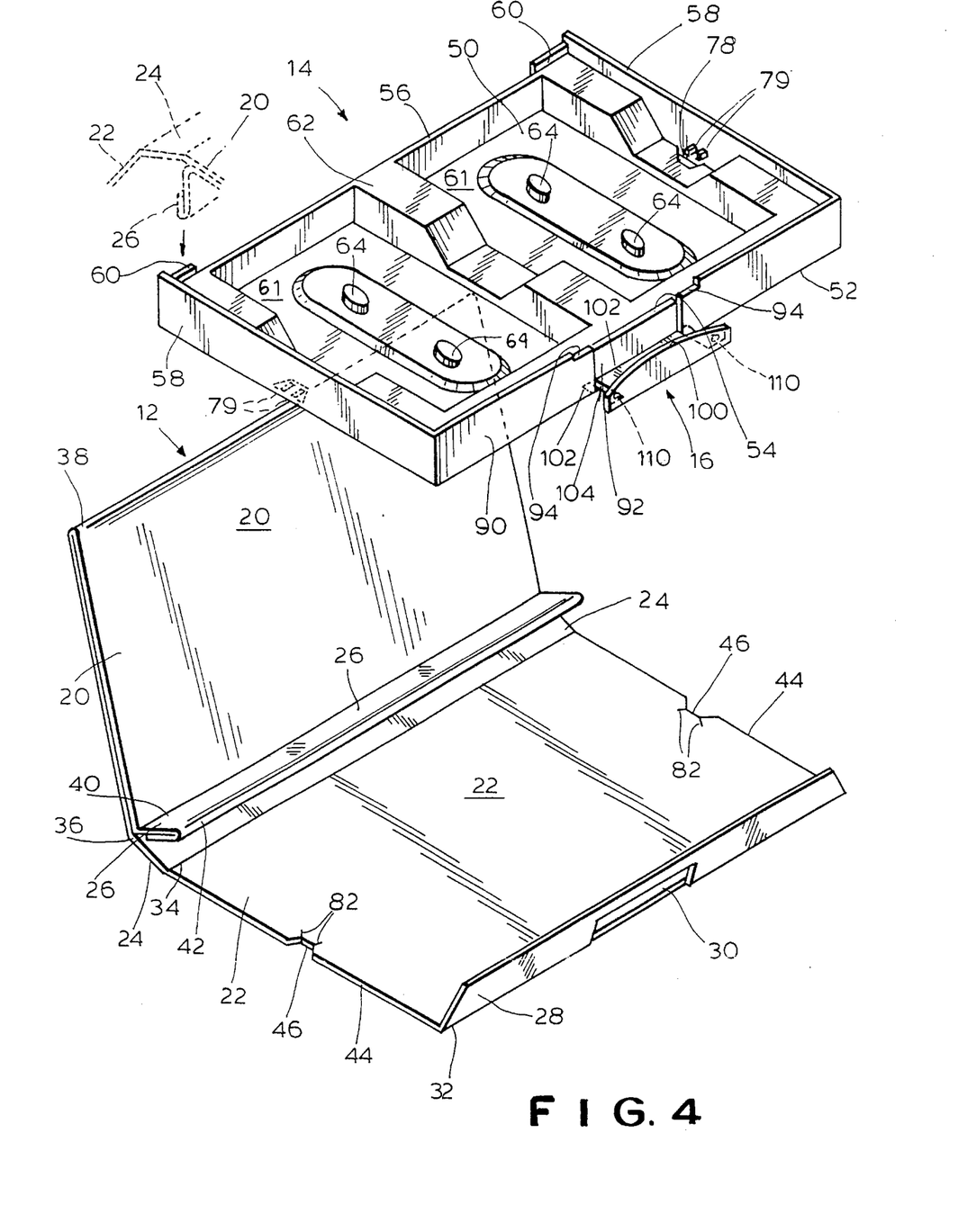
FIG. 4 is an exploded, isometric view thereof with a portion of the flap being illustrated in phantom line in position for insertion into the holder.

Referring now in particular to FIG. 4, the plurality of panels 12 includes a top or upper end panel 20, a bottom or lower end panel 22 and an outer spine 24 connecting the end panels 20, 22. An inner spine flap 26 is secured to the outer spine 24 either directly or via the top panel 20. The bottom panel 22 additionally defines at the free end thereof a resiliently bent end portion 28, which in turn defines an interior panel slot 30, and adjacent each lateral side 44 thereof a weakened and recessed portion 46 for purposes which will become apparent hereinafter. The top panel 20 and the flap 26 are preferably of double thickness.

Figure 2:
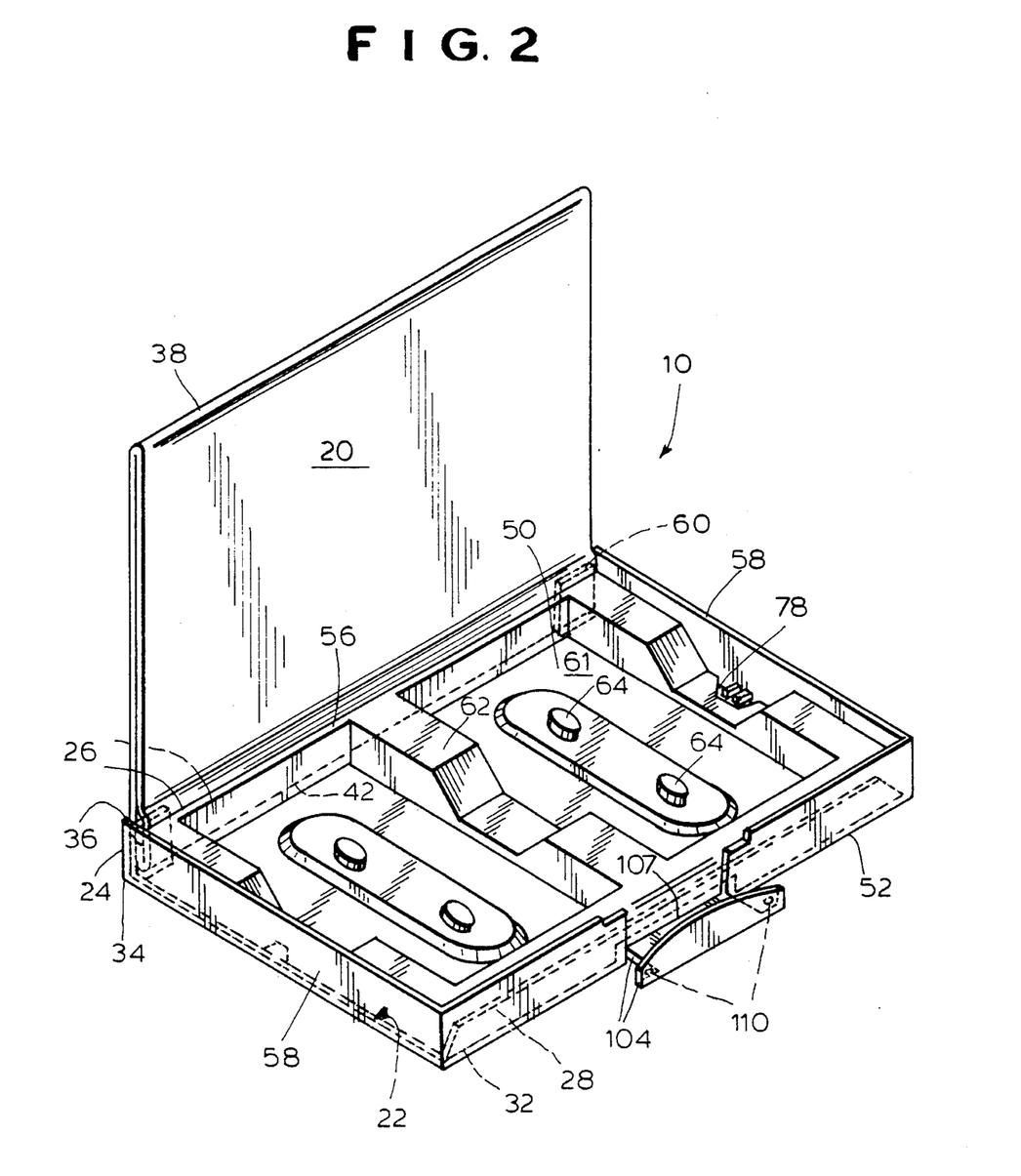
FIG. 2 is an isometric view thereof, with the storage package being in the open orientation.

The plurality of panels 12 is movable between an open orientation wherein the end panels 20, 22 are not substantially overlying and access to the contents of the package is enabled (as illustrated in FIGS. 2 and 4) and a closed or collapsed orientation wherein the end panels 20, 22 are substantially overlying, the contents of the package are not accessible, and the storage package is in a compact orientation for storage purposes (as illustrated in FIG. 1). The plurality of panels is preferably formed from a single interconnected sheet of paperboard of suitable dimensions, the paperboard being folded at 32 to define the resiliently bent end portion 28, at 34 and 36 to define the outer spine 24, at 38 to define the free end of the top panel 20 and provide a double thickness to the top panel 20, and at 40 and 42 to define the inner spine flap and provide a double thickness to at least a portion thereof. However, it will be appreciated that, while as illustrated the flap 26 is formed by one end of the paperboard sheet from which the plurality of panels is created, in other embodiments (for example, where only a single thickness front panel 20 is desired) the flap 26 may be an independently formed element secured to the plurality of panels (for example, glued to the outer spine 24).

It will be appreciated that the reversely bent end portion 28 and the weakened and recessed portions 46 of the bottom panel 22 as well as the inner spine flap 26 are provided for the preferred glueless embodiment of the present invention and may be dispensed with where a non-glueless embodiment is used—for example, where the bottom panel 22 and outer spine 24 are glued against the corresponding surfaces of the compartment 14 using a hot melt or like conventional glue.

Still referring to FIG. 4 in particular, the compartment 14 is substantially rigid and formed of a plastic such as polypropylene enabling the creation of a living hinge therein. The compartment 14 has an open top 50 (also in seen in FIG. 2), a bottom 52 (best seen in FIG. 5), a front end 54, a back end 56, and a pair of lateral sides 58 connecting the front and back ends 54, 56. As illustrated, the compartment 14 is suited for receiving a pair of audiocassettes (not shown) through the open top 50 thereof, one audiocassette fitting and into each subcompartment 61 thereof. The two subcompartments 61 are optionally divided by a laterally extending wall 62. The upwardly extending projections 64 in each subcompartment 61 engage appropriately positioned recesses in the bottom of each audiocassette to assist in maintaining the audiocassette within the subcompartment. It will be appreciated, however, by those skilled in the art, that the compartment or holder 14 may be configured and dimensioned to receive any article therein. For example, the compartment or holder may be almost square and define a planar top surface having a centrally disposed upstanding rosette for receiving and maintaining a compact disc (CD) thereon.

Figure 5:
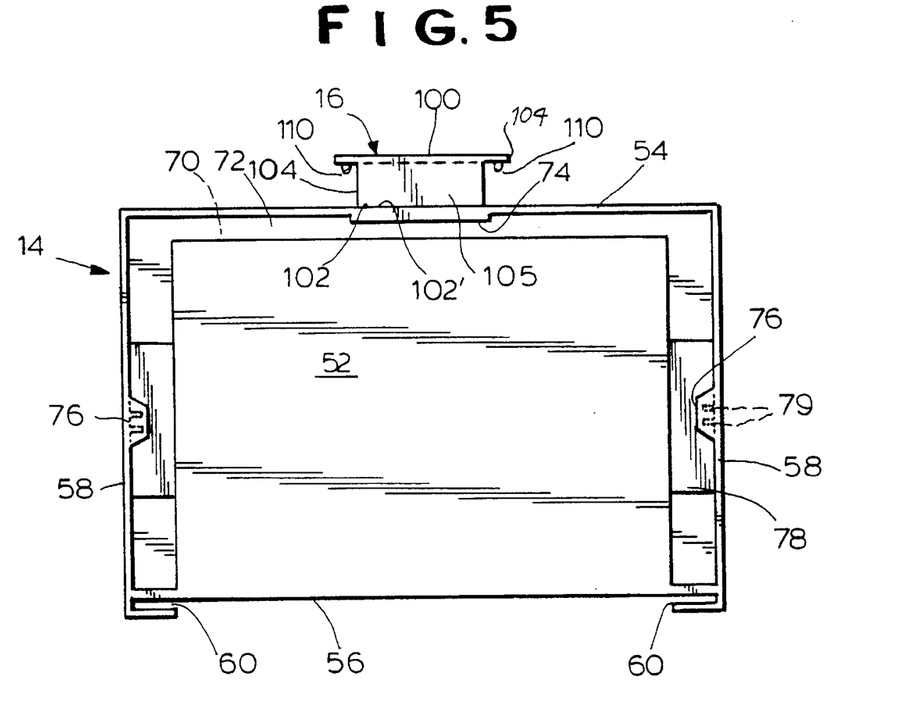
FIG. 5 is a bottom plan view of the holder.
Figure 6:
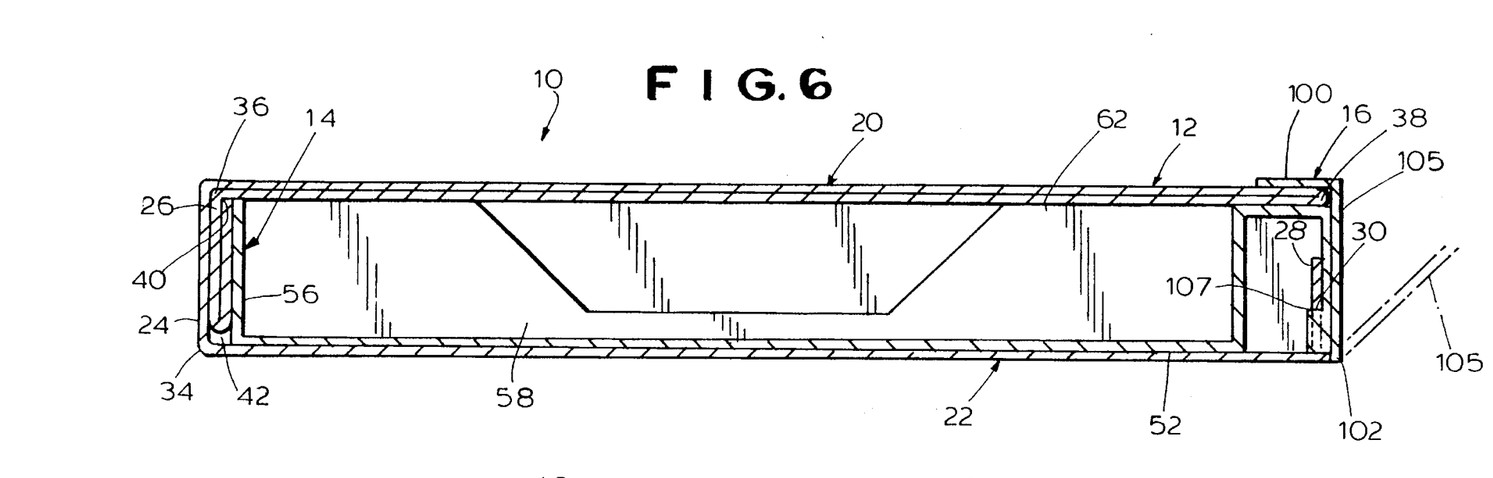
FIGS. 6, 7, 8 and 9 are sectional views taken along the lines 6—6, 7—7, 8—8 of FIG. 1 and line 9—9 of FIG. 8, respectively.
Figure 7:
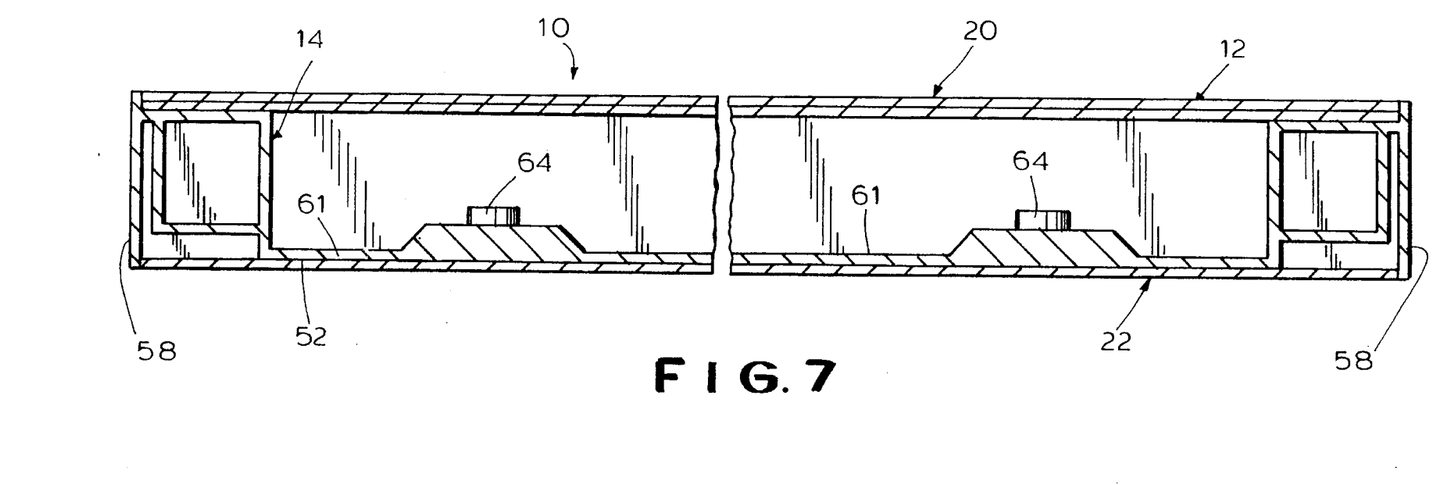

As best seen in FIG. 5, the compartment or holder 14 has a pair of flanges extending inwardly from the lateral sides 58 to at least partially define an open-top transverse slot 60 behind the back end 56 thereof, at least the two opposed ends of the slot 60 being defined. The transverse slot 60 is accessible through the open top 50 of the compartment 14 immediately behind the back wall 56 thereof. The slot 60 extends preferably from one compartment sidewall 58 to the other so that the flap 26 which enters thereinto may also extend the full width of the panels 20, 22. It will be appreciated, however, that in an alternate embodiment the ends of slot 60 may be spaced inwardly from the compartment lateral sidewalls 58 for additional protection of the paperboard edges of flap 26, in which case the lateral sidewalls of flap 26 would also be disposed inwardly of the lateral sidewalls 44 of the panels 20, 22.

As also best seen in FIG. 5, the bottom wall 52 of the compartment or holder 14 defines an open-bottom interior chamber 70 having a narrow passageway 72 leading thereinto from the compartment bottom wall 52. A rearwardly-facing horizontally-extending ledge 74 is disposed in the chamber, preferably horizontally aligned with the end cap 16.

Finally, still best seen in FIG. 5, the compartment defines, adjacent the compartment bottom 52 and adjacent each lateral side 58 thereof, an inwardly-directed horizontally-extending flange or retainer 76 and an undercut 78 formed between the retainer 76 and the compartment bottom 52.

Intermediate the compartment bottom 52 and the retainer 76, adjacent each lateral side 58 of the compartment, is a pair of lugs 79 which extend transversely a short distance towards the other lateral side 58. The length and width of the pair of lugs 79 is such that they are hidden in undercut 78 between the retainer 76 and the compartment bottom 52.

As earlier noted, the upper surface or open top 50 of the compartment 14 acts as a holder for receiving an article therein. The holder 14 has a generally planar and generally rectangular body, a pair of opposed lateral holder sidewalls 58, a back end wall 56, and an upwardly projecting front end wall 90 defining a central recess 92 and engaging means 94 for reasons that will be described hereinafter. The holder front end wall 90 is also referred to herein as the "front end wall 90" or "holder end wall 90."

The end cap 16 is of generally L-shaped configuration in cross-section and is formed of plastic, generally the same plastic as the compartment 14. The end cap 16 has a pair of ends—a top end 100 and a bottom end 102 (see FIG. 1)—a pair of upstanding opposed lateral sidewalls 104, and a connecting portion 105 connecting the various ends 100, 102 and sidewalls 104. The bottom end or leg 102 is directly pivotably secured to an adjacent end of the holder or compartment 14—namely, the holder front end wall 90 thereof, preferably by means of a living hinge 102' (see FIG. 5). Living hinges of this type are well known in the art and hence need not be described in further detail herein. The other leg or top end 100 of the end cap 16 is a free end which, when the package is in the closed orientation, overlaps a portion of both the holder front end wall 90 and the free end of the top panel 20, such portion being substantially less than the full length from one compartment or panel lateral sidewall 58 or 44, respectively, to the other, and preferably not exceeding 33% thereof.

Preferably, both the end cap 16 and the holder 14 are formed of the same plastic and are of a unitary, integral, one-piece construction formed in a single molding operation. Thus the end cap is permanently secured to the holder only at the bottom end 102 of the end cap 16 and is devoid of any living hinge 102' or line of weakness intermediate the ends 100, 102 thereof. The only living hinge is that which connects the entire end cap 16 to the entire compartment 14. However, if desired, the plastic of the end cap 16 may be different from the plastic of the holder 14.

Figure 3:
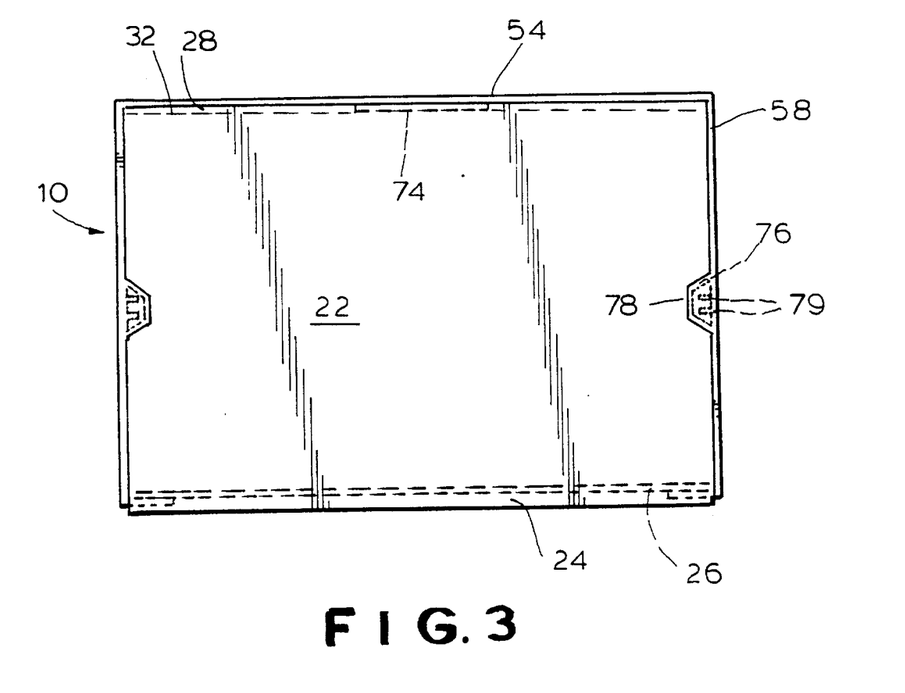
FIG. 3 is a bottom plan view thereof.

The end cap 16 is pivotable about the living hinge 102' between an open orientation (illustrated in FIGS. 2 and 4–5) wherein it, and particularly top end 100 thereof, does not interfere with movement of the plurality of panels between the open and collapsed orientations, and a releasable locking orientation (illustrated in FIGS. 1 and 3) wherein the end cap 16, and in particular the top end 100 thereof, overlaps the top panel 20 in the closed orientation, thereby to preclude accidental movement of the plurality of panels out of the collapsed orientation.

In order to ensure that the end cap 16 remains in the releasable locking orientation (illustrated in FIGS. 1–3), the undersurface of the top end 100 is provided with downwardly projecting lugs or engaging means 110 spaced from the vertical plane of bottom end 102 in the locking orientation by the thickness of the outwardly projecting holder front end wall 90. Thus, when the end cap 16 is in the releasable locking orientation with the bottom end 102 and the adjacent portion of the top end 100 occupying the central recess 92 of the upwardly projecting holder front end wall 90, the lugs or engaging means 110 of the end cap 16 engage the engaging means 94 of the holder 14. More particularly, the recessed engaging portions 94 of the front end wall 90 of holder 14 about central recess 92 occupy the gap between the bottom end 102 and the lugs or engaging means 110 of the end cap 16. The lugs 110 thus act as a stop or abutment means precluding movement of the end cap 16 out of the locking orientation until the top end 100 is lifted slightly (at the same time as it is being moved forwardly) so that the lugs 110 are raised sufficiently to pass over the compartment recessed engaging portions 94. While the structure described above provides a preferred engagement between the end cap 16 and the compartment or holder 14 (and in particular with the compartment or holder end wall 90), a variety of alternative mechanical engagements may be used to releasably secure the end cap 16 in its locked orientation. For example, instead of the undersurface of the top end 100 of end cap 16 providing the engaging surface 110 of the end cap, the side surfaces of the end cap may be provided with the engaging means (such as a pattern of projections or indentations) adapted to releasably engage with engaging means on the sides of the central recess 92 (such as a pattern of indentations or projections). Typically, although not necessarily, these engagements will rely upon the existence of at least a slight degree of flexibility in the end cap 16 or at least a portion thereof.

Because end cap 16 is substantially shorter than either the holder 14 or the end panels 20, 22, it resembles the catch on a diary or travel book and thus is aesthetically acceptable. The correspondingly shorter length of the living hinge 102' connecting the end cap 16 to the holder 14 reduces the resistance to movement of the living hinge 102' between its extreme positions, both in fact and in the perception of the user.

To assemble the panels 12 and compartment 14 illustrated separately in FIG. 4 to form the assembly 10 illustrated in FIG. 2, the inner spine flap 26 is first inserted downwardly from above into the partially formed slot 60 (as illustrated in phantom line in FIG. 4). A certain amount of transverse play between the inner spine flap 26 and the slot 60 is permissible as the disposition will be fixed by the panels 20,22 abutting the inner portion of the compartment lateral sidewalls 58. Then the outer spine 24 is brought parallel to the inner spine flap 26 and hence parallel to the compartment back end 56. It will be appreciated that the assembly 10 thus opens much like a book, with the outer spine 24 following the binding of the book (here, the back end 56 of the compartment) and not being displaceable therefrom.

The reversely bent portion 28 of the back panel 22 is then inserted from below the compartment bottom wall 52 upwardly through passageway 72 and into interior chamber 70. While the reversely bent portion 28 of the bottom panel 22 may have to be manually bent somewhat to enable this insertion through the narrow passageway 72, once the reversely bent portion 28 is released within the interior chamber 70, the natural resiliency of the fold 32 between the reversely bent portion 28 and the remainder of the bottom panel 22 will cause the reversely bent portion 28 to unfold somewhat, so that horizontally-extending ledge 74 enters the transverse slot 30 of reversely bent portion 28 to maintain the same therein against accidental displacement. If desired, forwardly-facing ledges or lugs (not shown) may also be provided on the back wall of passageway 72 in order to assist in orienting the reversely bent portion 28 such that horizontally-extending ledge 24 enters transverse slot 30. Indeed, in special applications it may be desirable for the horizontally-extending ledge 74 to be forwardly facing (from the back surface of passageway 72) and for lugs or other horizontally-extending ledges to orient the reversely bent portion 28 rearwardly (rather than forwardly) so that the modified horizontally extending ledge 74 enters the transverse slot 30 from the back thereof. In any event, the object is for the reversely bent portion 28 to pass through the passageway 72, enter the chamber 70, and become fixed therein.

With the reversely bent portion 28 thus fixed in the passageway 72 and interior chamber 70, and the interior spine flap 26 disposed within the transversely-extending slot 60, both ends of the bottom panel 22 are firmly held against the compartment bottom wall 52. Depending upon the relative width and length of the bottom panel 22 and compartment bottom wall 52, the lateral sidewalls 44 of the bottom panel 22 will remain planar and lay flat against the compartment bottom wall 52. This is especially so where the bottom panel 22 is held under a certain degree of tension at one end by the reversely bent portion 28 (within the interior passageway 70 and chamber 72) and at the other end by the outer spine 24 (via the fitting of inner spine flap 26 within slot 60).

Figure 8:
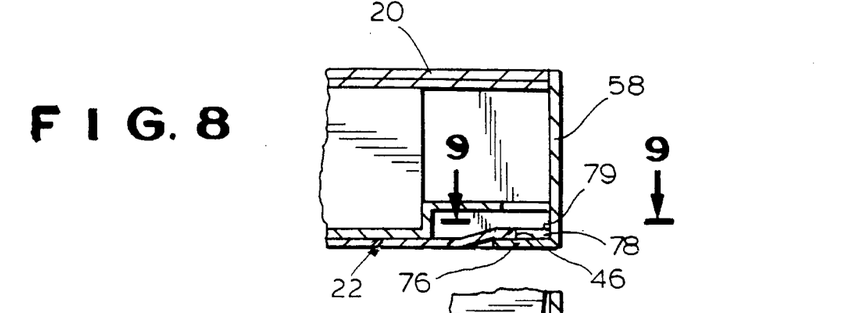
Figure 9:
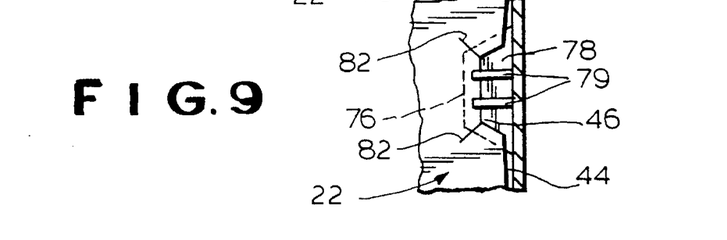

However, in certain instances—for example, where the surface area of the paperboard panels is large or the paperboard has stretched over time—the lateral sidewalls 44 of the bottom panel 22 may begin to bow outwardly from the container bottom wall 52. To prevent this from happening, the weakened and recessed portions 46 of the bottom panel 22 adjacent the lateral sidewalls 44 thereof are manually slightly depressed (towards the compartment bottom wall 52) so that the recessed portion 46 bows towards the compartment bottom wall 52 and enters into the undercut 78 intermediate the retainer 76 and the compartment bottom 52, as illustrated in FIG. 8. Accordingly, the recess of each portion 46 is adequate to enable passage of the recessed portion 46 past the retainer 76, but not so much that the retainer 76 cannot prevent the recessed portion 46 from subsequently accidentally slipping out of the undercut 78. It has been found that the recessed portion performs better where the bottom wall 22 is cut slightly thereabout as at relief cuts 82 (see FIGS. 4 and 9).

The weakened and recessed portions 46 of the bottom panel 22 are then received about the lugs 79. At this point, the lugs 79 serve to further immobilize movement of the bottom panel 22 towards either end 32, 34 thereof. Clearly other means may be utilized to the same ends, including a single lug instead of a pair of lugs or even a projection extending downwardly from the main plane or body of the compartment bottom 52 towards the retainer 76. Where the immobilization of the bottom panel 22 by the inner spine panel 26 and the reversely bent portion 28 is adequate, the lugs 79 may be dispensed with entirely.

Other means for securing the holder or compartment 14 to the bottom panel 22 without the use of glue are described in the aforementioned U.S. patent applications Ser. No. 08/126,240 and 08/983,634.

To summarize, the present invention provides a storage package, such as a storage package for recording medium, which in a preferred embodiment utilizes a short flipper or end cap having a length substantially less than that of the holder and/or panel end wall, the end cap being permanently secured so the holder is only at one end of the end cap and being devoid of any living hinge or line of weakness intermediate the ends thereof. The present invention further provides a storage package, such as a storage package for recording medium, which in a preferred embodiment is glueless to facilitate separation of the paperboard and plastic components thereof and yet holds the lateral side walls of the bottom or back panel to the holder without bowing. The present invention provides further a plastic intermediate for use in making such storage packages, the storage packages and intermediates being simple and inexpensive to manufacture, maintain and use.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A storage package for an article comprising:
   (A) a plurality of panels including a pair of end panels, said plurality of panels being movable between an open orientation enabling access to any contents of the package and a collapsed orientation for storage purposes;
   (B) a holder formed of plastic disposed on one of said end panels for receiving an article therein, said holder having one end thereof remote from the other of said end panels when said plurality of panel is in said open orientation, said holder having a pair of opposed lateral sidewalls and on said one end an upwardly projecting end wall defining a central recess; and
   (C) an end cap formed of plastic and having a pair of ends, one end of said end cap being directly pivotally secured to said one end of said holder and the other end of said end cap being a free end pivotable to overlap a topmost of said plurality of panels and maintain said plurality of panels in said collapsed orientation, said end cap having a portion thereof adapted to releasably engage said holder end wall when said plurality of panels is in said collapsed orientation and said end cap occupies said holder end wall recess such that said other end of said end cap overlaps a topmost of said plurality of panels and maintains said plurality of panels in said collapsed orientation, thereby to preclude accidental movement of said plurality of panels out of said collapsed orientation, said end cap being permanently secured to said holder only at said one end of said end cap and being devoid of any living hinge intermediate said ends thereof.

2. The package of claim 1 wherein said end cap is directly pivotally secured to said holder by a living hinge.

3. The package of claim 2 wherein said living hinge extends substantially less than the entire width of said holder end wall.

4. The package of claim 2 wherein said end cap and said holder are of a unitary, integral, one-piece construction formed in a single molding operation.

5. The package of claim 2 wherein said end cap plastic is polypropylene.

6. The package of claim 1 wherein said end cap plastic is different than said holder plastic.

7. The package of claim 1 wherein said plurality of panels is formed of paperboard.

8. The package of claim 1 wherein said plurality of panels in said open orientation has no panel overlying said panel on which said holder is disposed, thereby enabling access to said holder and any article thereon, and in said collapsed orientation has each of said panels overlapping one another, thereby to provide a compact package for storage.

9. The package of claim 1 wherein said end cap is generally L-shaped and has a pair of opposed lateral sidewalls defining end cap engaging means and a connecting portion connecting the same, and said holder has a generally planar end wall and a pair of facing holder end wall edges defining holder engaging means adapted to engage cooperatively with said end cap engaging means.

10. The package of claim 9 wherein said end cap connecting portion is appreciably spaced from said end cap ends and adapted to releasably engage said holder end wall at a portion thereof spaced from said one end of said holder.

11. A storage package for an article comprising:
   (A) a plurality of paperboard panels including a pair of end panels, said plurality of panels being movable between an open orientation enabling access to any contents of the package and a collapsed orientation for storage purposes;
   (B) a holder formed of plastic and disposed on one of said end panels for receiving an article therein, said holder having one end thereof remote from the other of said end panels when said plurality of panels is in said open orientation, said holder having a generally planar and generally rectangular holder body and a pair of opposed lateral holder sidewalls and on said one end of said holder an upwardly projecting end wall defining a central recess and engaging means thereabout; and
   (C) an end cap formed of plastic and having a pair of ends, one end of said end cap being directly pivotally secured to said one end of said holder, and the other end of said end cap being a free end, said end cap being generally L-shaped and having a pair of upstanding opposed lateral sidewalls and a connecting portion connecting the same, said end cap sidewalls defining engaging means adapted to engage cooperatively with said holder engaging means when said plurality of panels is in said collapsed orientation and said end cap occupies said holder end wall recess such that said other end of said end cap maintains said plurality of panels in said collapsed orientation, thereby to preclude accidental movement of said plurality of panels out of said collapsed orientation, said end cap being permanently secured to said holder only at said one end of said end cap and being devoid of any living hinge intermediate said ends thereof;
   said plurality of panels in said open orientation having no panel overlying said panel on which said holder is disposed, thereby enabling access to said holder and any article thereon, and in said collapsed orientation having each of said panels overlapping one another, thereby to provide a compact package for storage.

12. A storage package intermediate for use with a plurality of panels including a pair of end panels, the plurality of panels being movable between an open orientation enabling access to any contents of the package and a collapsed orientation for storage purposes, said intermediate comprising:
   (A) a holder formed of plastic configured and dimensioned to be disposed on one of the end panels for receiving an article therein, said holder having one end thereof remote from the other of the end panels when the plurality of panels is in said open orientation, said holder having a pair of opposed lateral sidewalls and on said one end an upwardly projecting end wall defining a central recess; and
   (B) an end cap formed of plastic and having a pair of ends, one end of said end cap being configured and dimensioned to be directly pivotally secured to said one end of said holder and the other end of said end cap being a free end, said end cap having a portion thereof spaced from both said ends thereof adapted to releasably engage said holder end wall at a portion thereof spaced from said one end of said holder when the plurality of panels is in said collapsed orientation and said end cap occupies said holder end wall recess such that said other end of said end cap maintains the plurality of panels in said collapsed orientation, thereby to preclude accidental movement of the plurality of panels out of said collapsed orientation, said end cap being permanently secured to said holder only at said one end of said end cap and being devoid of any living hinge intermediate said ends thereof.

13. The intermediate of claim 12 wherein said end cap is directly pivotally secured to said holder by a living hinge.

14. The intermediate of claim 13 wherein said living hinge extends substantially less than the entire width of said holder end wall.

15. The intermediate of claim 13 wherein said end cap and said holder are of a unitary, integral, one-piece construction formed in a single molding operation.

16. The intermediate of claim 13 wherein said end cap plastic is polypropylene.

17. The intermediate of claim 12 wherein said end cap plastic is different than said holder plastic.

18. The intermediate of claim 12 wherein said end cap is generally L-shaped and has a pair of lateral sidewalls defining end cap engaging means and a connecting portion connecting the same, and said holder has a generally planar end wall and a pair of facing holder end wall edges defining holder engaging means adapted to engage cooperatively with said end cap engaging means.

19. The intermediate of claim 18 wherein said end cap connecting portion is appreciably spaced from said end cap ends and adapted to releasably engage said holder end wall.

20. A storage package intermediate, comprising:
   (A) a holder formed of plastic for receiving an article therein, said holder having a generally planar and generally rectangular holder body and a pair of opposed lateral holder sidewalls and on one end an upwardly projecting end wall defining a central recess and engaging means thereabout; and
   (B) an end cap of generally L-shaped cross-section, formed of plastic and having a pair of ends, a pair of upstanding opposed lateral sidewalls, and a connecting portion connecting the same, one end of said end cap being directly pivotally secured to said one end of said holder and the other end of said end cap being a free end, said end cap sidewalls defining engaging means adapted to engage cooperatively with said holder engaging means when said end cap occupies said holder end wall recess, said end cap being permanently secured to said holder only at said one end of said end cap and being devoid of any living hinge or intermediate said ends thereof.

21. A glueless storage package for an article comprising:
   (A) a substantially rigid compartment, formed of plastic and having an open top, a bottom, a front end, a back end and a pair of lateral sides connecting said ends, for receiving an article through said open top, said compartment at least partially defining an open-top transverse slot at said back end, said compartment further defining an open-bottom interior chamber having a passageway thereinto leading from said bottom into said chamber and a horizontally-extending ledge in said chamber, said compartment also defining adjacent said compartment bottom and adjacent each said lateral side thereof a horizontally-extending retainer and an undercut between said retainer and said compartment bottom; and (B) a plurality of interconnected panels including a top end panel, a bottom end panel, an outer spine connecting said end panels, and an inner spine flap secured to said outer spine, said panels being movable between a collapsed orientation, wherein said panels are substantially overlying, and an open orientation, wherein said panels are not substantially overlying, said flap being configured and dimensioned to be at least partially received in said open-top transverse slot, said bottom end panel having adjacent each lateral side thereof a weakened and recessed portion adapted to be forcibly received and releasably maintained in a respective one of said undercuts, and said bottom end panel defining at a free end thereof a resiliently bent end portion, said end portion defining a panel slot and being configured and dimensioned to pass through said passageway into said chamber and to at least partially unbend within said chamber such that said chamber ledge enters said panel slot to releasably resist removal of said end portion from said chamber;

said package being devoid of glue securing said compartment and said panels together.

22. The package of claim 21 wherein said chamber and passageway extend substantially the length of an edge of said compartment.

23. The package of claim 21 wherein said panels and spine are formed of resilient paperboard.

24. A glueless storage package intermediate comprising:

a substantially rigid compartment, formed of plastic and having an open top, a bottom, a front end, a back end and a pair of lateral sides connecting said ends, for receiving an article through said open top and maintaining the article therein, said compartment at least partially defining an open-top transverse slot at said back end;

said compartment further defining an open-bottom interior chamber having a passageway thereinto leading from said bottom into said chamber and a horizontally-extending ledge in said chamber; and said compartment also defining adjacent said compartment bottom and adjacent each said lateral side thereof a horizontally-extending retainer and an undercut between said retainer and said compartment bottom.

25. A glueless storage package intermediate for use with a substantially rigid compartment formed of plastic and having an open top, a bottom, a front end, a back end and a pair of lateral sides connecting said ends, for receiving an article through said open top, said compartment defining adjacent said compartment bottom and adjacent each said lateral side thereof a horizontally-extending retainer and an undercut between said retainer and compartment bottom, said intermediate comprising a plurality of interconnected panels including a top end panel, a bottom end panel, and a spine connecting said end panels, said panels being movable between a collapsed orientation, wherein said panels are substantially overlying, and an open orientation, wherein said panels are not substantially overlying, said bottom end panel having adjacent each lateral side thereof a weakened and recessed portion adapted to be forcibly received and releasably maintained in a respective one of said undercuts.

26. The intermediate of claim 25 wherein the compartment at least partially defines an open-top transverse slot adjacent the back end, and said plurality of panels additionally includes a flap secured at one end to said spine, said flap being configured and dimensioned to be at least partially received in the open-top transverse slot of the compartment.

27. The intermediate of claim 25 wherein the compartment defines an open-bottom interior chamber having a passageway thereinto leading from said bottom into the chamber and a horizontally-extending ledge, and said bottom panel defines at a free end thereof a resiliently bent end portion, said end portion defining a panel slot and being configured and dimensioned to pass through the passageway into the chamber and to at least partially unbend within the chamber such that the chamber ledge enters said panel slot to releasably resist removal of said end portion from the chamber.

28. A glueless storage package for an article comprising:

(A) a substantially rigid compartment, formed of plastic and having an open top, a bottom, a front end, a back end and a pair of lateral sides connecting said ends, for receiving an article through said open top, said compartment at least partially defining an open-top transverse slot at said back end, said compartment further defining an open-bottom interior chamber having a passageway thereinto leading from said bottom into said chamber and a horizontally-extending ledge in said chamber, said compartment also defining adjacent said compartment bottom and adjacent each said lateral side thereof a horizontally-extending retainer and an undercut between said retainer and said compartment bottom, said compartment having on said front end an upwardly projecting front wall defining a central recess;

(B) a plurality of interconnected panels including a top end panel, a bottom end panel, an outer spine connecting said end panels, and an inner spine flap secured to said outer spine, said plurality of panels being movable between a collapsed orientation, wherein said panels are substantially overlying for storage purposes, and an open orientation, wherein said panels are not substantially overlying for enabling access to the contents of the package, said flap being configured and dimensioned to be at least partially received in said open-top transverse slot, said bottom end panel having adjacent each lateral side thereof a weakened and recessed portion adapted to be forcibly received and releasably maintained in a respective one of said undercuts, and said bottom end panel defining at a free end thereof a resiliently bent end portion, said end portion defining a panel slot and being configured and dimensioned to pass through said passageway into said chamber and to at least partially unbend within said chamber such that said chamber ledge enters said panel slot to releasably resist removal of said end portion from said chamber; and (C) an end cap formed of plastic and having a pair of ends, one end of said end cap being directly pivotally secured to said compartment front wall and the other end of said end cap being a free end, said end cap having a portion thereof adapted to releasably engage said compartment front wall when said plurality of panels is in said collapsed orientation and said end cap occupies said compartment front wall recess such that said other end of said end cap maintains said plurality of panels in said collapsed orientation, thereby to preclude accidental movement of said plurality of panels out of said collapsed orientation, said end cap being permanently secured to said holder only at said one end of said end cap and being devoid of any living hinge intermediate said ends thereof.

* * * * *